United States Patent
Olson et al.

[11] Patent Number: 5,423,253
[45] Date of Patent: Jun. 13, 1995

[54] DEVICE FOR ADJUSTING HEAD PRESSURE IN TOP SIDE COOKER

[75] Inventors: Larry R. Olson; James H. Beck, both of Capron; George J. Baumbich, Glen Ellyn; Douglas E. Ries, Belvidere, all of Ill.

[73] Assignee: Keating of Chicago, Inc., Bellwood, Ill.

[21] Appl. No.: 127,009

[22] Filed: Sep. 27, 1993

[51] Int. Cl.6 .......................... A47J 37/00; B30B 1/08; B30B 15/22
[52] U.S. Cl. ...................................... 99/351; 100/233; 100/270
[58] Field of Search ................ 99/349, 351; 100/93 P, 100/233, 270, 271, 293; 156/583.8, 583.9

[56] References Cited
U.S. PATENT DOCUMENTS

| Re. 32,994 | 7/1989 | Adamson | 99/349 |
| 2,454,334 | 11/1948 | Moir | 100/93 P |
| 4,697,504 | 10/1987 | Keating | 99/349 |
| 4,763,571 | 8/1988 | Bergling | 99/349 |
| 5,167,750 | 12/1992 | Myers | 100/93 P |
| 5,247,874 | 9/1993 | George, II et al. | 99/349 |

Primary Examiner—David A. Scherbel
Assistant Examiner—Randall E. Chin
Attorney, Agent, or Firm—Nicholas A. Camasto

[57] ABSTRACT

A pressure adjustment mechanism for a top side cooker head includes an adjustable element secured to the top side cooker head arm. In one embodiment the element is adjustable in discrete one-half turn increments of a screw and in another embodiment is continuously adjustable. Both embodiments change the moment arm of a pneumatic cylinder ram that applies a counterbalance force to the cooker head. The invention permits adjustment of the force applied to foodstuffs on the griddle surface from 0 to the weight of the cooker head.

9 Claims, 3 Drawing Sheets

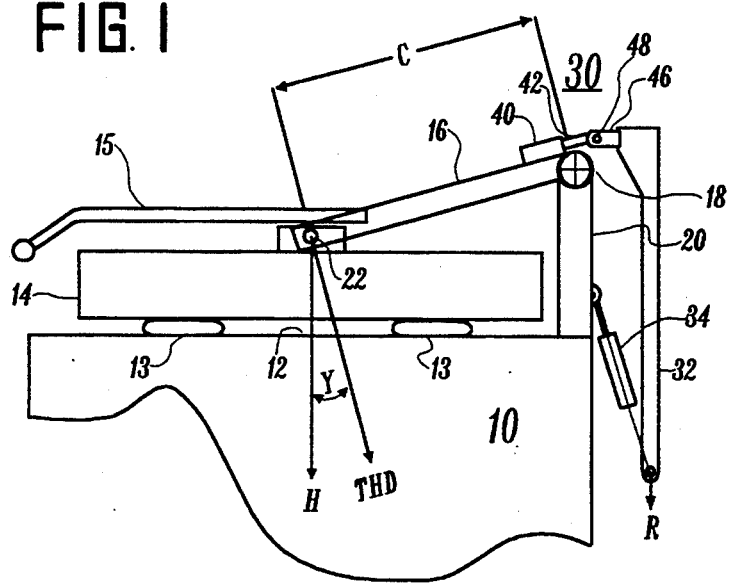
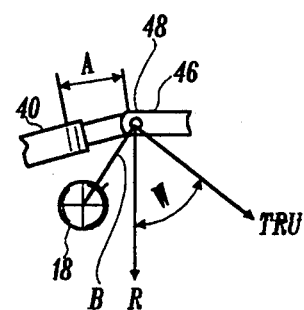
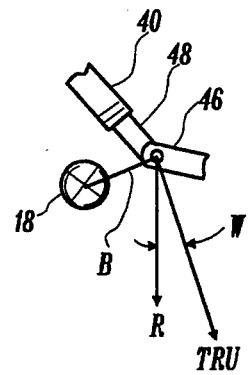
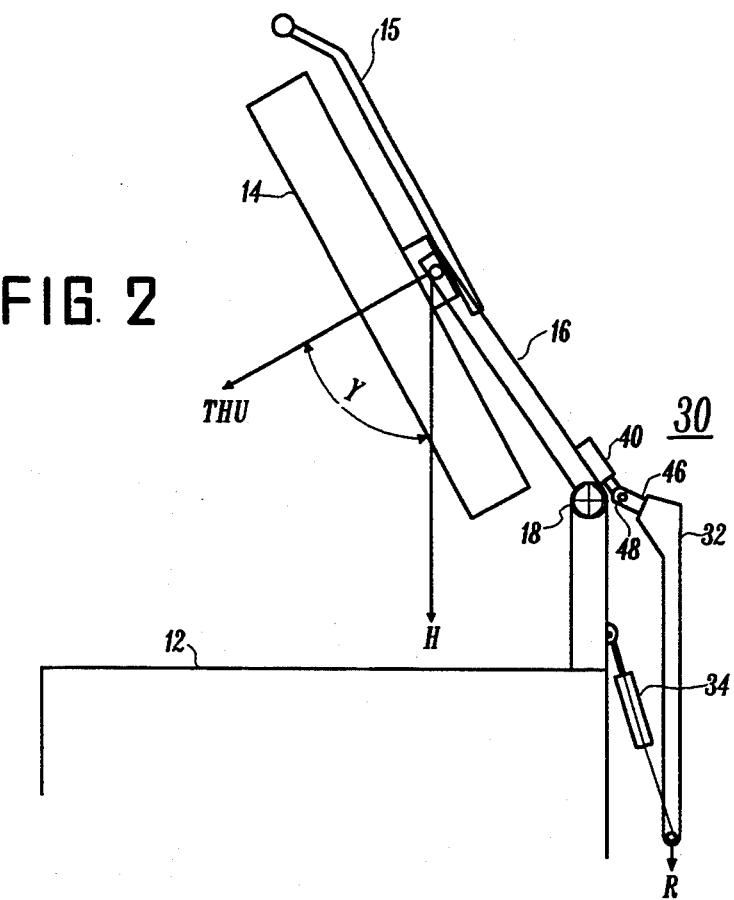

DEVICE FOR ADJUSTING HEAD PRESSURE IN TOP SIDE COOKER

BACKGROUND OF THE INVENTION AND PRIOR ART

This invention relates generally to commercial cooking equipment and specifically to so-called two-sided clam shell cookers which include a cooker head, having an upper cooking surface, that is pivotally movable into a lowered cook position adjacent a conventional griddle surface.

The advantages of two-sided cooking of foodstuffs are well known. Not only is cooking time dramatically reduced with two-sided cooking, but certain foods such as hamburgers, are improved in taste and texture by the application of force during the cooking process. The desired force is a function of the type of food being cooked and the experience of the person using the cooking equipment in determining the optimum cooking pressure for particular types of foodstuffs. The actual force applied to the foodstuffs depends upon a number of factors including the weight of the cooker head, the opposing counterbalance force and the physics of the top head cooker system with respect to the moment arms of the various forces.

The present invention is directed to a very simple, effective adjustment mechanism for adjusting the force applied to foodstuffs by the cooker head without necessitating tear down of the equipment or prolonged interruption of operation.

OBJECTS OF THE INVENTION

A principal object of the invention is to provide an improved top side cooking device.

Another object of the invention is to provide a top side cooking device that is readily adjustable to vary the cooker head pressure.

A further object of the invention is to provide a top side cooking device, the head pressure of which is readily adjustable in the field without the use of tools.

BRIEF DESCRIPTION OF THE DRAWINGS

These and other objects and advantages of the invention will be apparent upon reading the following description in conjunction with the drawings wherein like reference characters denote like elements, in which:

FIG. 1 is a partial side view of a top side cooking device constructed in accordance with the invention with the cooker head in the lowered, cook position;

FIG. 1A is an enlarged portion showing the linkage arrangement and forces involved for the cooking device of FIG. 1;

FIG. 2 is a view similar to FIG. 1 with the cooker head in the raised position;

FIG. 2A is similar to FIG. 1A for the forces present in FIG. 2;

DESCRIPTION OF THE PREFERRED EMBODIMENT

Figure 3:
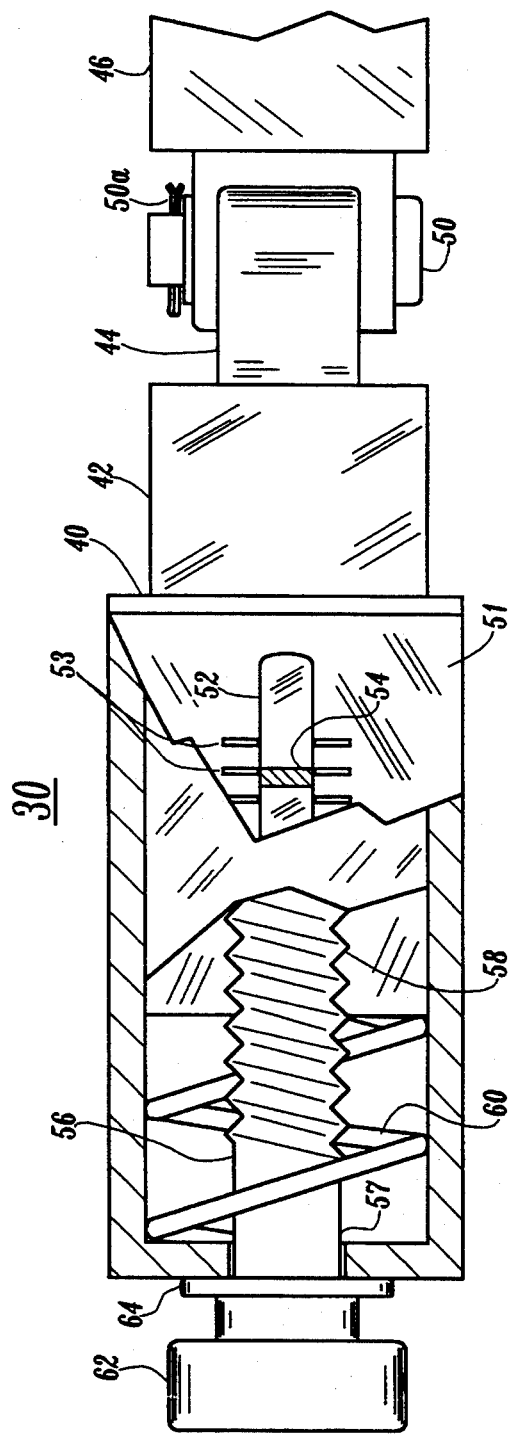
FIGS. 3 and 4 are partial enlarged cutaway views of a continuous adjustment mechanism in one form of the invention.

Referring to FIG. 1, a cooking grill 10 having a griddle surface 12 with foodstuffs 13 supported thereon, is shown. A clam shell or top side cooking device has a cooker head 14 which is in contact with foodstuffs 13 on griddle surface 12. Cooker head 14 is relatively heavy and includes means for heating (not shown) a cooking surface thereon for enabling two-sided cooking of foodstuffs 13 under pressure. The cooker head 14 is supported for limited pivotal movement at a pivot 22 from an arm 16. Extending forwardly from arm 16 is a handle 15 to enable an operator to raise and lower the top side cooker head 14. Arm 16 is pivotally mounted at a pivot 18 that is supported on a rear wall 20 of cooking grill 10. A counterbalance force is applied by a pneumatic ram 34 that is secured to cooking grill 10 and to the lower end of a ram arm 32. An adjustment mechanism, generally indicated by reference numeral 30, includes a housing 40 (supporting an adjustable element) and an angled extension link 46 of ram arm 32, which elements are joined together to form a pivot axis 48 as will be described in more detail. The illustration in FIG. 1 shows the top side cooker head 14 in its down or cook position whereas in FIG. 2, the top side cooker head 14 is in its raised or inoperative position.

FIGS. 1A and 2A are partial enlarged views of the adjustment mechanism 30 of the top side cooking device of the invention. The various forces and angles indicated thereon denote the forces, moment arms and angles used to calculate the effective down force exerted on the foodstuffs 13 by a cooker head 14 of weight H working against a counterbalancing ram force R. The length (dimension C) of the top head arm 16 is fixed since it is pivotally secured at one end to rear wall 20 and supports cooker head 14 at pivot 22. Dimension A (FIG. 1A) is variable in accordance with the invention and represents the change in the ram moment arm, i.e. the moment arm of the force applied by the ram 34. The torque about pivot 18 applied in the direction toward the foodstuffs is indicated by THD, with D denoting the down position (U correspondingly denotes the up position) of the movable cooker head 14. TRD thus represents the counterbalancing torque about pivot 18 of the ram 34 exerted in the down position and TRU denotes the counterbalancing torque of the ram 34 in the up position. The ram force is applied at an angle W, which changes depending upon the up or down position, and the head force is applied at an angle Y to the respective torque vectors.

The invention provides for limited adjustment or change in length A by means of a screw type adjuster as will be described in more detail in connection with FIGS. 3-6. The following table illustrates a practical example of the minimum and maximum adjustment lengths A used in the preferred embodiment of the invention and the resulting forces and angles.

| ELEMENT | MIN | | MAX | |
| --- | --- | --- | --- | --- |
|  | UP | DN | UP | DN |
| A - ADJUSTMENT LENGTH (IN.) | 0.750 | 0.750 | 1.750 | 1.750 |
| B - MOMENT ARM-RAM (IN.) | 1.750 | 1.750 | 2.250 | 2.250 |
| C - MOMENT ARM-HEAD (IN.) | 11.25 | 11.25 | 11.25 | 11.25 |
| W - FORCE ANGLE OF | 13 | 86 | 12 | 61 |

-continued

| ELEMENT | MIN | | MAX | |
|---|---|---|---|---|
| | UP | DN | UP | DN |
| RAM (DEG.) Y - FORCE ANGLE OF HEAD (DEG.) | 60 | 13 | 36 | 13 |

In the actual design, at the maximum adjustment (A=1.750), the torque due to the weight of the cooker head 14 is equal and opposite to the torque of the ram 34, i.e. THD is equal to TRD. The ram force equals 10 times the weight of the cooker head to achieve this balance or "float". Thus R is equal to 10H in the preferred embodiment design. With a 10:1 force ratio and length A being at its minimum (0.750), the torque in the down or "drop" position is about 9H which translates into a force of about 80% of the weight of cooker head 14 pressing against the foodstuffs on the griddle surface. Although in this embodiment the maximum force is limited to 80% of the cooker head weight, it can be readily perceived that reducing A to less than 0.750" will permit a force against the foodstuffs equal to 100% of the weight of the cooker head.

The inventive embodiments provide for discrete (one-half screw turn) and continuous screw adjustments (as will be seen) to select from 0 to 100% cooker head weight applied as a force in the down (cook) position, which permits a substantial range of pressure to meet cooking preferences and to compensate for wear of the equipment. The continuous adjustment is also readily accessible from the front and made by simply turning a knob. Finally, in the up position, there is a ram-favorable torque of about the same amount for both adjustment extremes, which results in a net downward (backward) force of approximately 6H. This counterbalancing renders the cooker head relatively easy to lift.

Figure 4:
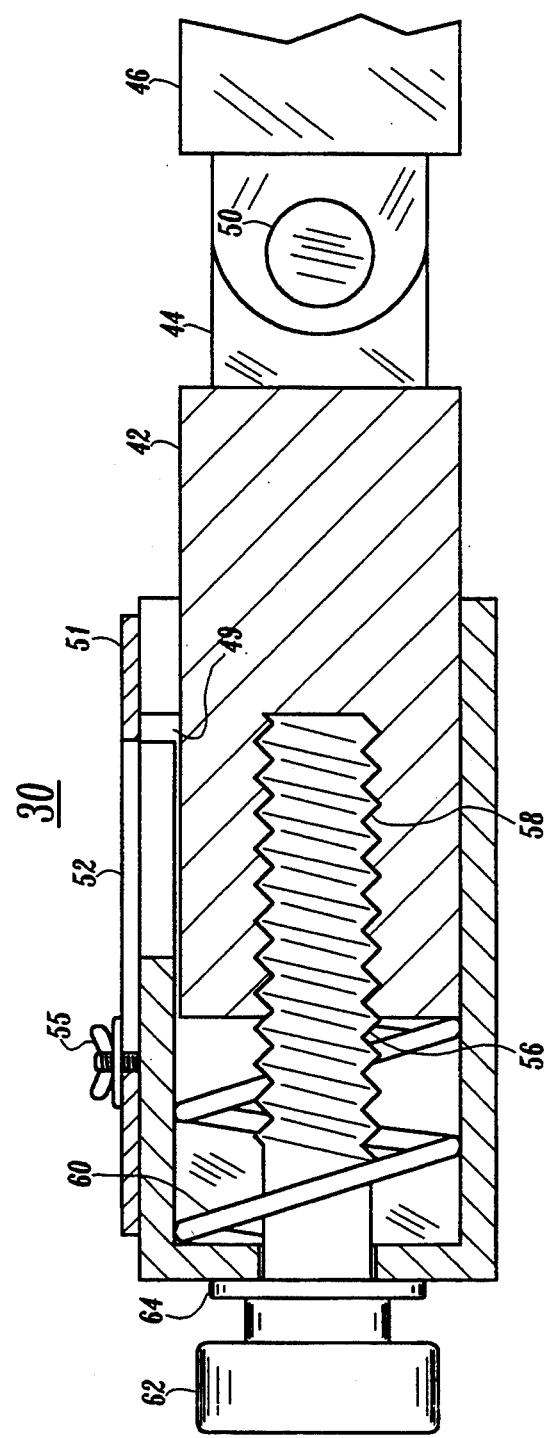
Figure 5:
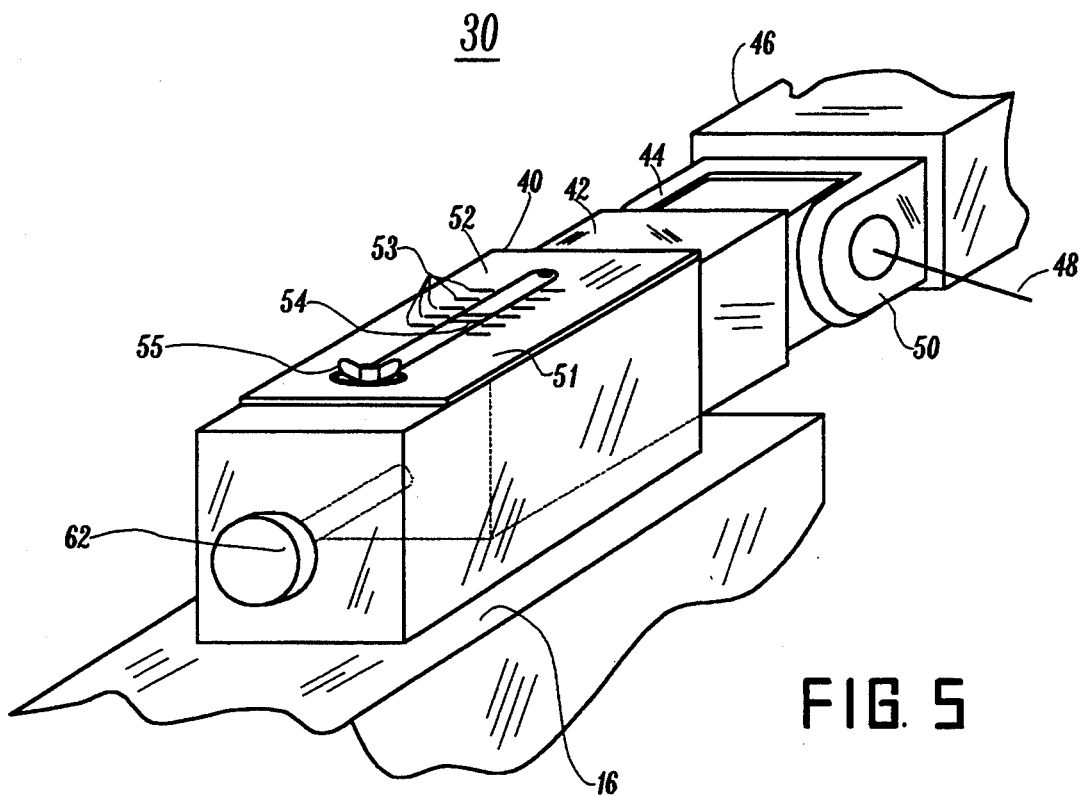
FIG. 5 is a partial perspective view of the adjustment mechanism of FIGS. 3 and 4.

FIGS. 3, 4 and 5 show the continuous adjustment mechanism 30 of the invention. A generally rectangular hollow housing 40 (that is rigidly secured to cooker arm 16) includes a similarly shaped adjustable element 42, having a terminating tongue 44, arranged for slidable movement therein. Ram link 46 has a mating U-shaped end that is engageable, by means of a clevis pin 50, with tongue 44 to form pivot axis 48 between ram link 46 and housing 40. Housing 40 may be secured to cooker head arm 16 by any suitable means, such as welding. A cotter pin 50a secures clevis pin 50 in position in suitable apertures (not shown) in tongue 44 and ram link 46. An indicia plate 51 is movably secured to housing 40 by means of a slot 52 and a wing nut 55. Slot 52 overlies a similar opening 49 in housing 40 to enable adjustable element 42 to be visible therethrough. Specifically, an indicator stripe 54 is painted on or applied to the visible surface of adjustable element 42 and the amount of adjustment length A (and hence the down force applied by cooker head 14 to the foodstuffs) can be determined by reference to suitable indicia 53 on movable indicia plate 51 adjacent to slot 52. The adjustable element 42 is moved rectilinearly within housing 40 by means of an adjustment screw 56 that has a knob 62 secured thereto. Knob 62 acts upon a washer 64 bearing against the end of housing 40, which includes a suitably sized aperture 57 therein for passage of screw 56. Adjustment screw 56 has a threaded portion which engages a corresponding threaded portion 58 in the body of adjustable element 42. Bias is maintained against adjustable element 42 by a captivated compression spring 60 acting between housing 40 and adjustable element 42. Adjustment screw 56 is thus rotatable with respect to housing 40 and adjustable element 42 to control the positioning of adjustable element 42 relative to housing 40.

Operation of the adjustment device is straightforward. By suitable turning of knob 62, adjustable element 42 may be drawn into or forced out of housing 40 to change dimension A, thus changing the moment arm of ram 34 and the force angles W and Y for ram 34 and cooker head 14, respectively.

Those skilled in the art will readily perceive that calibration of indicator stripe 54 and indicia 53 may be readily accomplished by loosening wing nut 55 and sliding indicia plate 51 along housing 40 until a zero or base one of indicia markings 53 is aligned with indicator stripe 54 at the balance or float position of cooker head 14. In this manner, the markings of indicia 53 will indicate known changes in force applied by cooker head 14 as adjustable element 42 is moved within housing 40.

Figure 6:
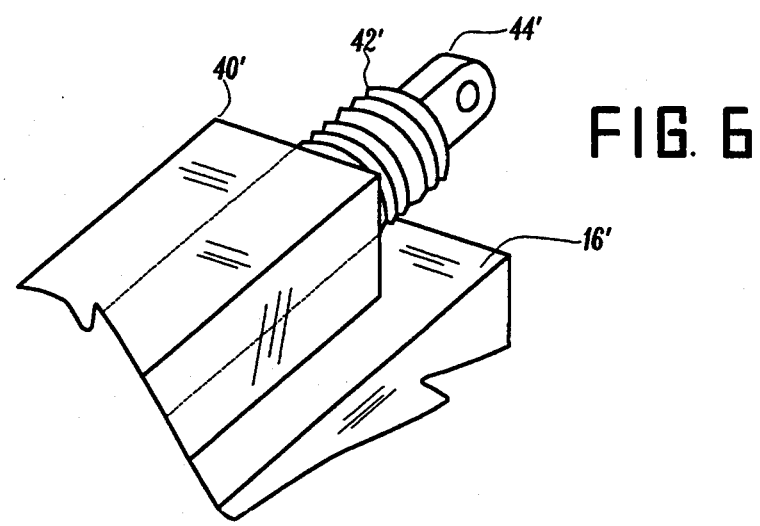
FIG. 6 is a partial perspective view of a discrete adjustment mechanism of the invention.

The embodiment of FIG. 6 illustrates a discrete adjustment that, while not as convenient as the continuous adjustments, is significantly lower in cost. In this arrangement discrete one-half turns of screw 42' are made in housing 40' to adjust dimension A. Housing 40' is solid in this embodiment and includes a mating threaded aperture within which screw 42' is threaded. It will be appreciated that this adjustment requires that clevis pin 50 be removed and tongue 44' be disengaged from the ram link to permit rotation of screw 42'.

It will be seen that the described arrangements provide a readily accessible mechanism for rapidly and accurately adjusting the pressure applied by the cooker head to foodstuffs on the griddle surface. It is recognized that numerous changes in the described embodiment of the invention will be apparent to those skilled in the art without departing from its true spirit and scope. The invention is to be limited only as defined in the claims.

What is claimed is:

1. A top side cooking device comprising:
   a pivotally mounted cooker head movable from a lowered cook position, for exerting force on foodstuffs positioned on a griddle surface, to a raised position;
   means for applying a counterbalance force to said cooker head; and
   adjustment means including an adjustable screw element coupled between said counterbalance force applying means and said cooker head for changing the moment arm of said counterbalance force for varying the force applied by said cooker head to said foodstuffs between 0 and the weight of said cooker head.

2. The device of claim 1 wherein said adjustment means further includes a readily accessible knob coupled to said adjustable screw element.

3. The device of claim 2 further including a ram link and wherein said counterbalance force is supplied by a pneumatic cylinder mounted to said cooking device, said pneumatic cylinder coupled to said adjustable screw element through said ram link.

4. The device of claim 3 further including a pivotally mounted arm supporting said adjustable screw element, and wherein said adjustable screw element includes indicia means indicating the force applied by said cooker head to said foodstuffs.

5. The device of claim 1 wherein said adjustable screw element is movable in discrete one-half turns.

6. A top side cooking device comprising:
   a cooker head;
   an arm supporting said cooker head for pivotal movement from a lowered cook position to a raised position, said head, when in said cook position, exerting a force on foodstuffs positioned on a griddle surface;
   means for applying a counterbalance force to said cooker head;
   an adjustable screw element mounted to said arm; and wherein
   turning of said adjustable screw element changes the movement arm of said counterbalance force for adjusting the force applied by said cooker head to said foodstuffs from 0 to the weight of said cooker head.

7. The device of claim 6 wherein said adjustable screw element includes indicia means for indicating said force and wherein said adjustable screw element is continuously adjustable by means of a knob.

8. The device of claim 6 wherein said adjustable screw element is adjustable in discrete one-half turn steps.

9. The device of claim 6 wherein said counterbalance force applying means comprises a pneumatic cylinder mounted to said cooking device, said pneumatic cylinder coupled to said adjustable screw element.

* * * * *